United States Patent
Dong et al.

(10) Patent No.: US 11,822,829 B2
(45) Date of Patent: Nov. 21, 2023

(54) METHOD, DEVICE, AND PROGRAM PRODUCT FOR DATA REBUILDING

(71) Applicant: EMC IP Holding Company LLC, Hopkinton, MA (US)

(72) Inventors: Wei Dong, Shanghai (CN); Zhonghua Zhu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/470,614

(22) Filed: Sep. 9, 2021

(65) Prior Publication Data

US 2022/0244862 A1 Aug. 4, 2022

(30) Foreign Application Priority Data

Jan. 29, 2021 (CN) .......................... 202110127269.6

(51) Int. Cl.
*G06F 11/10* (2006.01)
*G06F 3/06* (2006.01)

(52) U.S. Cl.
CPC ............ *G06F 3/0683* (2013.01); *G06F 3/064* (2013.01); *G06F 11/1088* (2013.01); *G06F 2211/1016* (2013.01); *G06F 2211/1033* (2013.01)

(58) Field of Classification Search
CPC ..... G06F 11/1088; G06F 3/0683; G06F 3/064
USPC ........................................................ 714/6.22
See application file for complete search history.

(56) References Cited

U.S. PATENT DOCUMENTS

| | | | |
|---|---|---|---|
| 7,305,579 B2 | 12/2007 | Williams | |
| 8,463,798 B1* | 6/2013 | Claudatos | G06F 16/178 707/752 |
| 10,642,690 B1* | 5/2020 | Tian | G06F 3/061 |
| 10,929,243 B2 | 2/2021 | Creed et al. | |
| 2012/0079317 A1 | 3/2012 | Nelogal et al. | |
| 2014/0149357 A1* | 5/2014 | Gupta | G06F 11/1471 707/652 |
| 2014/0281689 A1* | 9/2014 | Fischer | G06F 11/1092 714/6.22 |
| 2020/0057567 A1* | 2/2020 | Hutcheson | G06F 9/45558 |
| 2020/0159625 A1* | 5/2020 | Hutcheson | G06F 11/1461 |
| 2021/0200639 A1* | 7/2021 | Yamamoto | G06F 11/1092 |
| 2021/0318809 A1* | 10/2021 | Xia | G06F 11/1088 |
| 2021/0334034 A1* | 10/2021 | Ryu | G06F 3/0679 |
| 2021/0357140 A1* | 11/2021 | Mandagere | G06F 11/1451 |

FOREIGN PATENT DOCUMENTS

CN 107943720 A * 4/2018 ........... G06F 12/123

* cited by examiner

*Primary Examiner* — Chae M Ko
(74) *Attorney, Agent, or Firm* — BainwoodHuang (57) ABSTRACT

A technique for data reconstruction includes determining a plurality of types of data stored in a storage disk; determining an order in which data reconstruction is to be performed on the plurality of types of data based on corresponding likelihoods that the plurality of types of data are expected to be accessed; and performing the data reconstruction on the plurality of types of data in the determined order. Such a technique can improve system performance during data reconstruction and reduce the access delay.

28 Claims, 7 Drawing Sheets

METHOD, DEVICE, AND PROGRAM PRODUCT FOR DATA REBUILDING

CROSS-REFERENCE TO RELATED APPLICATION

This application claims priority to Chinese Patent Application No. CN202110127269.6, on file at the China National Intellectual Property Administration (CNIPA), having a filing date of Jan. 29, 2021 and having "METHOD, DEVICE, AND PROGRAM PRODUCT FOR DATA REBUILDING" as a title, the contents and teachings of which are herein incorporated by reference in their entirety.

TECHNICAL FIELD

Embodiments of the present disclosure generally relate to a data storage technology, and more particularly, to a method, an electronic device, and a computer program product for data reconstruction.

BACKGROUND

With the operation of a storage system, a storage disk in the system may fail or be pulled out due to the expiration of the service life. A new storage disk or a spare storage disk will replace the original storage disk. In this case, it is necessary to start a data reconstruction process to reconstruct data in the original storage disk to the new disk or the spare disk. During the data reconstruction process, the overall performance of the storage system may be affected to some extent, because data that is being reconstructed or not being reconstructed cannot be accessed. Therefore, it is desirable to minimize the impact of data reconstruction on the performance of the storage system as much as possible.

SUMMARY OF THE INVENTION

The embodiments of the present disclosure relate to a solution for data reconstruction.

In a first aspect of the present disclosure, a method for data reconstruction is provided. The method includes: determining a plurality of types of data stored in a storage disk; determining an order in which data reconstruction is to be performed on the plurality of types of data based on corresponding likelihoods that the plurality of types of data are expected to be accessed; and performing the data reconstruction on the plurality of types of data in the determined order.

In a second aspect of the present disclosure, an electronic device is provided. The electronic device includes at least one processor and at least one memory storing computer program instructions. The at least one memory and the computer program instructions are configured to cause, together with the at least one processor, the electronic device to perform actions. The actions include: determining a plurality of types of data stored in a storage disk; determining an order in which data reconstruction is to be performed on the plurality of types of data based on corresponding likelihoods that the plurality of types of data are expected to be accessed; and performing the data reconstruction on the plurality of types of data in the determined order.

In a third aspect of the present disclosure, a computer program product is provided. The computer program product is tangibly stored on a computer-readable storage medium and includes computer-executable instructions that, when executed by a processor of a device, cause the device to perform actions. The actions include: determining a plurality of types of data stored in a storage disk; determining an order in which data reconstruction is to be performed on the plurality of types of data based on corresponding likelihoods that the plurality of types of data are expected to be accessed; and performing the data reconstruction on the plurality of types of data in the determined order.

It should be understood that the content described in the Summary of the Invention part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown by way of example instead of limitation, where.

Throughout all the accompanying drawings, the same or similar reference numerals are used to indicate the same or similar components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles and spirits of the present disclosure will be described below with reference to some example embodiments shown in the accompanying drawings. It should be understood that these specific embodiments are described only for the purpose of enabling a person skilled in the art to better understand and then implement the present disclosure, instead of limiting the scope of the present disclosure in any way.

In the description herein, the term data "reconstruction" refers to the activity of data that is lost due to the failure of a storage disk, and is used interchangeably with the term data "restoration," data "reconstitution," or data "recovery." "Disk" or "drive" or "device" failures are used interchangeably, but it is understood that not all storage drives use rotating disks. A redundant array of independent disks (RAID) array may be implemented, for example, using a solid state drive (SSD) device. The data reconstruction proposed in the present disclosure can be applied to device failures in a storage system caused by any reason.

Figure 1:
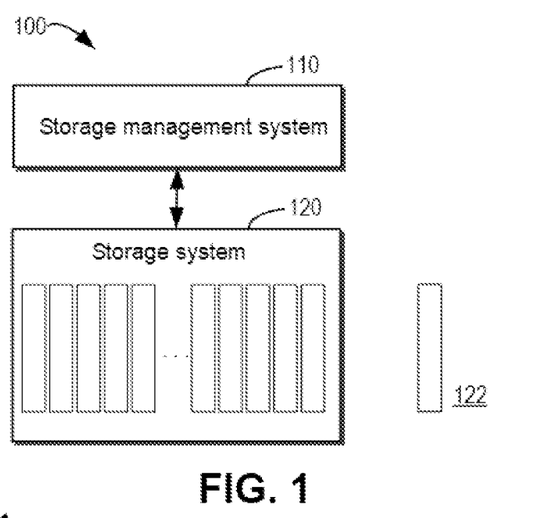
FIG. 1 shows a block diagram of an example storage environment in which an embodiment of the present disclosure may be implemented.

FIG. 1 shows a schematic diagram of example storage environment 100 in which an embodiment of the present disclosure may be implemented. As shown in FIG. 1, storage environment 100 includes storage management system 110 and storage system 120.

Storage management system 110 is configured to control and manage storage system 120, including storage space allocation, data access, data reconstruction, data backup, and the like for storage system 120. Storage system 120 includes a plurality of storage disks 122-1, 122-2, 122-3, . . . , 122-N (N is an integer greater than or equal to 1), and the like for providing a physical storage space for data. For ease of discussion, these storage disks are sometimes referred to collectively or respectively as storage disks 122. Herein, storage "disk" is sometimes used interchangeably with storage "drive," "drive," and storage "device."

Storage disk 122 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a Blu-ray disc, a serial-attached small computer system Interface (SCSI) disk (SAS), a serial advanced technology attachment (SATA) disk, any other magnetic storage devices and any other optical storage devices, or any combination thereof.

It should be understood that FIG. 1 only schematically shows units, modules, or components related to the embodiments of the present disclosure in storage environment 100. Various components shown in FIG. 1 are merely an example storage system management architecture, and in the storage system, there may be other architecture division manners, other units, modules, or components for other functions, and the like. Accordingly, the embodiments of the present disclosure are not limited to specific devices, units, modules, or components depicted in FIG. 1, but are generally applicable to a storage system of any storage technology. The various components (except storage disk 122) shown in FIG. 1 may be implemented in one or more computing devices/computing systems.

Figure 2:
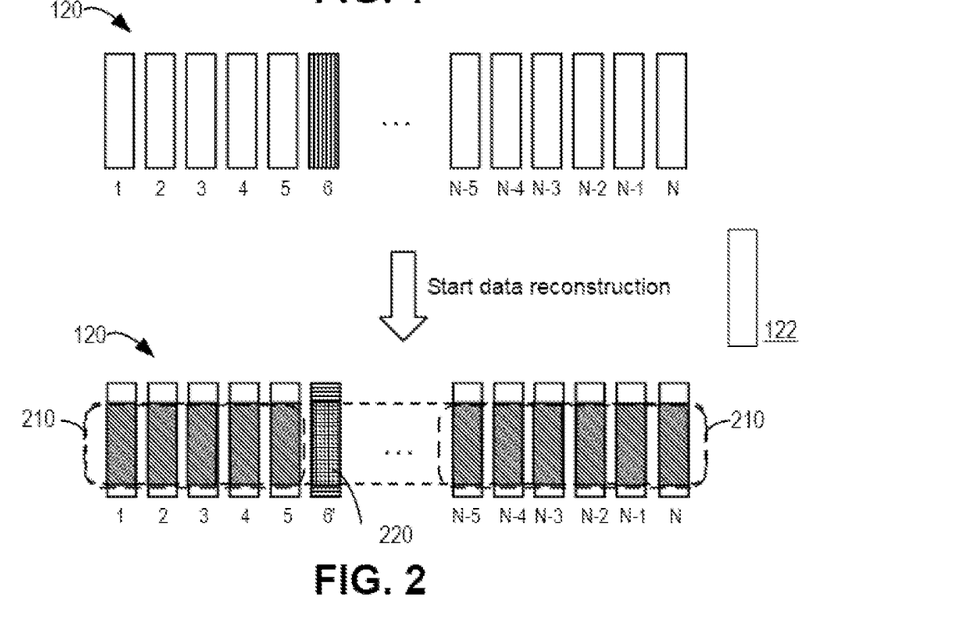
FIG. 2 shows an example of performing data reconstruction in a storage system.

In some cases, it may be necessary to reconstruct data stored in certain storage disk 122 in storage system 120. Data reconstruction may be required since certain storage disk 122 fails or is pulled out due to the expiration of the service life, or the disk is inaccessible due to other reasons. FIG. 2 shows an example of performing data reconstruction in a storage system. In the example of FIG. 2, storage system 120 includes N storage disks 122 indexed from 1 to N. It is assumed that storage disk 6 fails. Storage disk 6 will be replaced with new storage disk 6'. Storage management system 110 starts data reconstruction for storage disk 6 to store reconstructed data in storage disk 6'.

Generally, each storage disk 122 of storage system 120 stores valid data and parity data. The valid data refers to data stored by a user in storage system 120 and is sometimes also referred to as user data or host data. The parity data refers to information used to assist in recovering the valid data and is sometimes also referred to as a parity code or an error correction code. The generation of the parity data depends on a storage technology used. For example, in a storage system based on a redundant array of independent disks (RAID) technology, RAID stripes may include odd-even parity data in addition to valid data. The parity data can be used for error correction when the valid data is wrong or for recovering the corresponding valid data in the data reconstruction process.

The data in storage system 120 is usually evenly distributed into various storage disks 122. In the example of FIG. 2, after the data reconstruction process is started, data 210 in other storage disks 122 will be used to reconstruct data 220 originally stored in storage disk 6 to be stored in storage disk 6'. For example, some valid data and parity data in other storage disks may be used to reconstruct the valid data originally stored in storage disk 6, and the valid data in other storage disks may be used to reconstruct the parity data originally stored in storage disk 6. Various data reconstruction algorithms may be used to perform data reconstruction operations.

In traditional data reconstruction solutions, data reconstruction is usually performed with logical blocks one by one in a logical block addressing (LBA) order of the storage disk. Such a data reconstruction strategy makes the system performance, access delay, and the like of the storage system unsatisfactory.

Figure 3A:
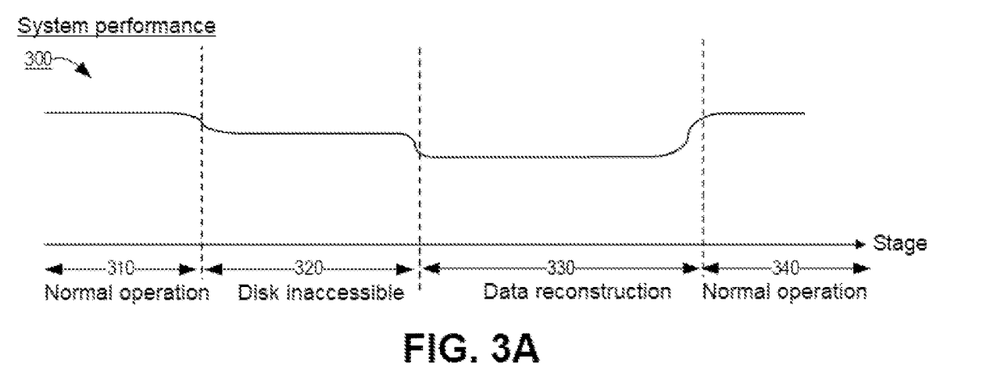
FIG. 3A shows an example of system performance of a storage system at various stages including data reconstruction.

FIG. 3A shows example curve 300 of system performance of a storage system at various stages including data reconstruction. In the example of FIG. 3A, the system performance of the storage system may be measured by the throughput and/or bandwidth (BW) of the system. The throughput may be measured, for example, by the number of I/O requests that can be processed by the system per unit time (e.g., the number of I/O requests processed per second (IOPS)).

In the example of FIG. 3A, if the storage disk of the storage system is inaccessible due to a failure or the like, the storage system enters disk inaccessible stage 320 from normal operation stage 310. In disk inaccessible stage 310, the system performance is reduced because the inaccessible storage disk cannot provide services. As the inaccessible storage disk is replaced with a new storage disk, the process will enter data reconstruction stage 330 to perform data reconstruction on the inaccessible storage disk. In data reconstruction stage 330, the system performance will be further reduced because the storage disk being reconstructed still cannot provide services, and meanwhile the data reconstruction operation will also occupy system bandwidth. After the data reconstruction is completed, the storage system enters normal operation stage 340, and the system performance is recovered to a normal level.

Figure 3B:
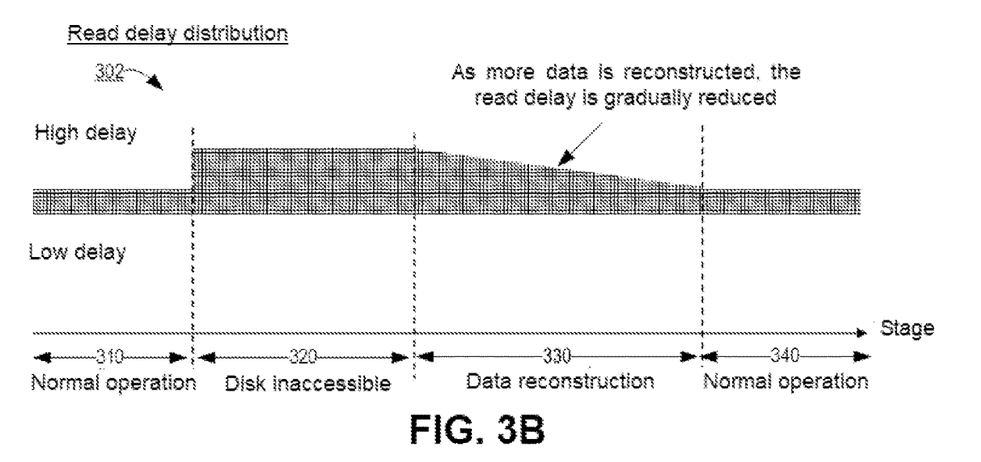
FIG. 3B shows an example of read delay distribution of a storage system at various stages including data reconstruction.

In the storage system, the inaccessibility and data reconstruction of the storage disks also have a great impact on a data access delay, especially the delay of read requests. FIG. 3B shows example read delay distribution 302 of a storage system at various stages including data reconstruction. As shown in FIG. 3B, in disk inaccessible stage 320, if a read request is to access data located in an inaccessible storage disk, the read delay is high since all data therein has not been reconstructed.

In data reconstruction stage 330, if data of some LBAs has been reconstructed to another storage disk used to replace the inaccessible storage disk, read requests addressed to these LBAs may be completed with a low delay. If the read request is addressed to an LBA that has not been reconstructed in data reconstruction stage 330, a storage management system will trigger a temporary data recovery process to read valid data and parity data from other storage disks to recover data currently to be read. But this process will cause a high delay. As shown in FIG. 3B, as more data in the inaccessible storage disk is reconstructed to a new storage disk, the read delay may be gradually reduced. After the data reconstruction is completed, the read delay is recovered to a normal level.

It can be seen that in the data reconstruction process, the system performance and the access delay are not satisfactory. It is expected to further improve the data reconstruction process.

Accordingly, the present disclosure proposes an improved solution for data reconstruction. According to this solution, if a data reconstruction operation of a certain storage disk is to be performed, data reconstruction is performed according to the type of data, and different types of data have respective likelihoods that the different types of data are expected to be accessed. An order in which data reconstruction is performed on a plurality of types of data is determined according to the likelihoods that the plurality of types of data are expected to be accessed. The data reconstruction is performed in the determined order. For example, the types of data that are more likely to be accessed may be reconstructed earlier, and the types of data that are less likely to be accessed may be reconstructed later. According to this solution, the system performance during data reconstruction can be improved and the access delay can be reduced.

Some example embodiments of the present disclosure will be discussed in more detail below with reference to the accompanying drawings.

Figure 4:
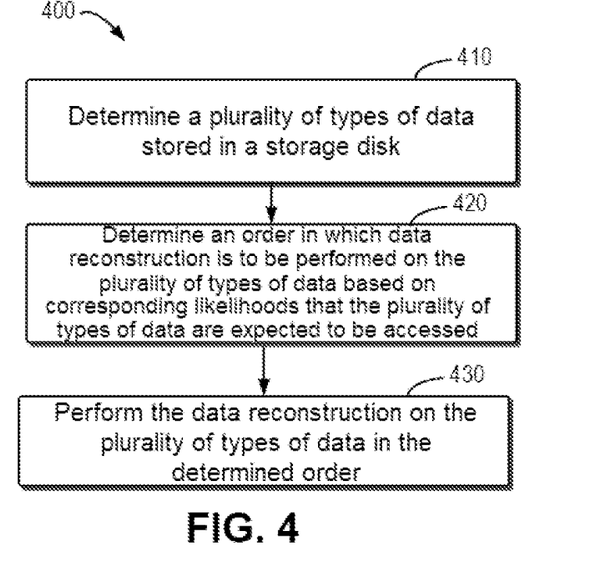
FIG. 4 shows a flowchart of a method for data reconstruction according to some embodiments of the present disclosure.

FIG. 4 shows a flowchart of process 400 for data reconstruction according to an embodiment of the present disclosure. In some embodiments, process 400 may be implemented at storage management system 110. For ease of description, reference will be made hereinafter to storage environment 100 of FIG. 1.

At block 410, storage management system 110 determines a plurality of types of data stored in storage disk 122. According to an embodiment of the present disclosure, the data stored in storage disk 122 in storage system 120 is divided into different types for performing data reconstruction by data types during the data reconstruction.

In some embodiments, the data of storage disk 122 may be divided into a valid data type and a parity data type. The valid data type corresponds to stored valid data, and the parity data type corresponds to stored parity data.

In some embodiments, the valid data may also be subdivided as needed. For example, the valid data type may be divided into a plurality of valid data subtypes. Correspondingly, the valid data in storage disk 122 may be divided into the plurality of valid data subtypes.

In some embodiments, the division of the plurality of valid data subtypes may be based on a popularity level of the valid data. The valid data in storage disk 122 may be accessed by a user, for example, to read. The popularity level of the valid data may be determined based on how often the valid data is accessed within a period of time. For example, if the valid data is accessed more frequently within a period of time, the valid data may have a higher popularity level. On the contrary, if the valid data is accessed less frequently within a period of time, the popularity level thereof is lower.

In addition to dividing the valid data by popularity, different subtypes of the valid data may also be divided according to other needs. As will be understood below, different types of data will reflect the likelihood that the data is expected to be accessed. Therefore, according to actual needs, the types of data may be distinguished in terms of the likelihood of data being accessed.

At block 420, storage management system 110 determines an order in which data reconstruction is to be performed on the plurality of types of data based on corresponding likelihoods that the plurality of types of data in storage disk 122 are expected to be accessed.

By distinguishing the types of the data in storage disk 122, different types of data have respective likelihoods that the types of the data are expected to be accessed. Based on such likelihoods, storage management system 110 may sort different types of data. For example, the type of data that is more likely to be accessed may be prioritized over the type of data that is less likely to be accessed. If the data that is more likely to be accessed is recovered first in the data reconstruction stage, the access to this part of data may be completed with a low delay in the data reconstruction stage, the access delay of the system is reduced, and the system performance may also be correspondingly improved.

In some embodiments of dividing a valid data type and a parity data type, the likelihood that data of the valid data type is expected to be accessed may be higher than the likelihood that data of the parity data type is expected to be accessed. This is because the data access to storage disk 122 is usually the access to the valid data. The parity data is mainly used to recover the valid data in the data reconstruction process or to correct a data error that is checked, but the probability of these cases is very low. Therefore, by completing the reconstruction of the valid data first, the data access to storage system 100 can be recovered to a normal level more quickly, even if the data reconstruction process still has to continue to perform the reconstruction of the parity data.

In some embodiments where the valid data type is divided into more valid data subtypes, the likelihoods that valid data subtypes of different popularity levels are expected to be accessed are different. More specifically, the likelihood that a valid data subtype with a higher popularity level is expected to be accessed is higher than the likelihood that a valid data subtype with a lower popularity level is expected to be accessed. This is because a higher popularity level usually means that this part of valid data was frequently accessed in the past period of time, and then is more likely to be accessed in the subsequent data access. Therefore, by first completing the reconstruction of valid data with a high popularity level, it is more likely to complete the access to valid data of high popularity with a low delay during the data reconstruction.

In some embodiments, the likelihood that a plurality of valid data subtypes are expected to be accessed is higher than the likelihood that the parity data type is expected to be accessed, because compared with the valid data that may be accessed by the user, the parity data will be used only in extreme cases.

In some embodiments, a bitmap may be constructed to indicate the type of data stored in one, some, or all of storage disks 122 in storage system 120. Specifically, the bitmap includes a plurality of bits, and each bit indicates the type of data stored in one of a plurality of storage blocks of storage disk 122.

In the bitmap, the granularity of the storage block indicated by each bit may be set as needed. In some embodiments, the storage block indicated by each bit may be set based on the smallest data access unit of storage disk 122. For example, if storage system 120 is based on a RAID technology, the storage block may be the size of a data block of a RAID stripe. In some examples, the storage block may be 4 KB, 64 KB, etc. Of course, other granularities are also feasible.

In the bitmap, the size of each bit may be related to the number of types to be indicated. For example, if the data of storage disk 122 is to be divided into a valid data type and a parity data type, each bit in the bitmap may be 1 bit in size, where the bit "1" may indicate the valid data type, and the bit "0" may indicate the parity data type (or vice versa).

Figure 5:
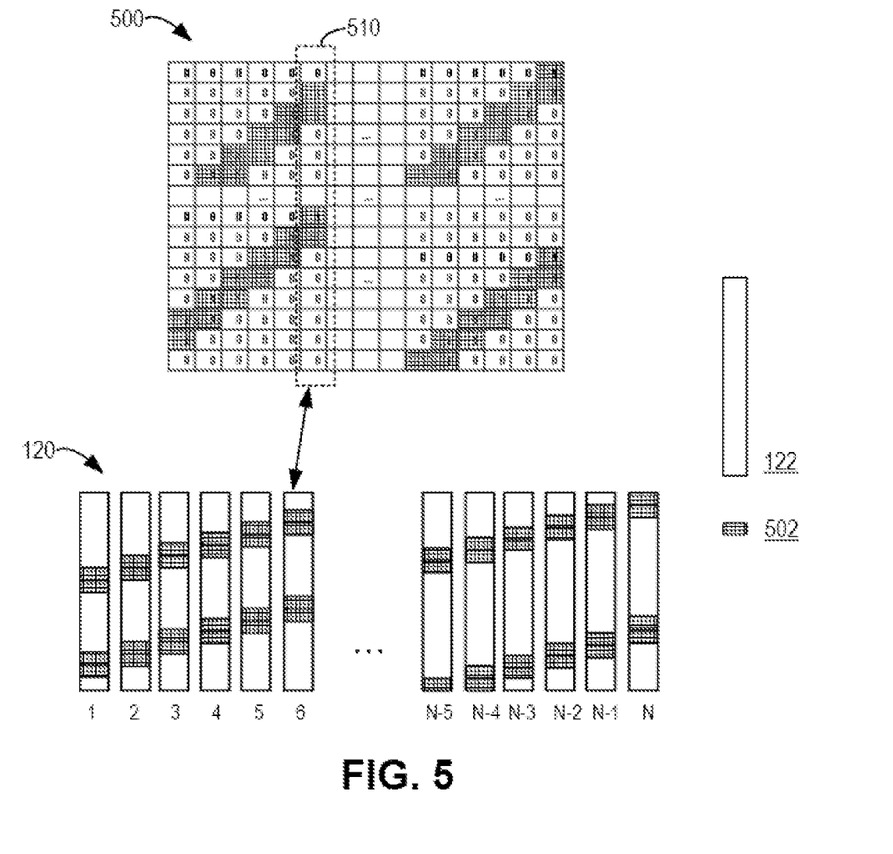
FIG. 5 shows an example of a bitmap for indicating a data type in a storage disk according to some embodiments of the present disclosure.

FIG. 5 shows example bitmap 500 according to some embodiments of the present disclosure. As shown in FIG. 5, each bit in bitmap 500 corresponds to a storage block in storage disk 122 (indexed from 1 to N) in storage system 120 to indicate the type of data stored in the storage block. In this example, it is assumed that each column of bitmap 500 corresponds to one storage disk 122 of storage system 120. For example, column 510 of bitmap 500 corresponds to storage disk 6, and each bit therein indicates the type of data of a storage block in storage disk 6.

In the example of FIG. 5, the bit "1" in each bit in bitmap 500 indicates the valid data type, and the bit "0" indicates the parity data type. According to bitmap 500, the "1" marked in each bit may indicate storage block 502 that stores valid data in storage disk 122. The remaining storage blocks may be determined to store parity data.

In some embodiments, if more types of data are stored in storage disk 122, for example, including a plurality of valid data subtypes and the parity data type, the size of each bit in the bitmap may be greater than 1 bit in order to distinguish these types. For example, if the valid data is divided into three valid data subtypes, each valid data subtype corresponds to one of a high popularity level, a medium popularity level, and a low popularity level, and each unit in the bitmap may include 2 bits to respectively indicate 4 possible types (including three valid data subtypes and the parity data type). For example, the value of each unit may include two bits 00, 01, 10, and 11, and every two bits are used to indicate one of the 4 types.

Figure 6:
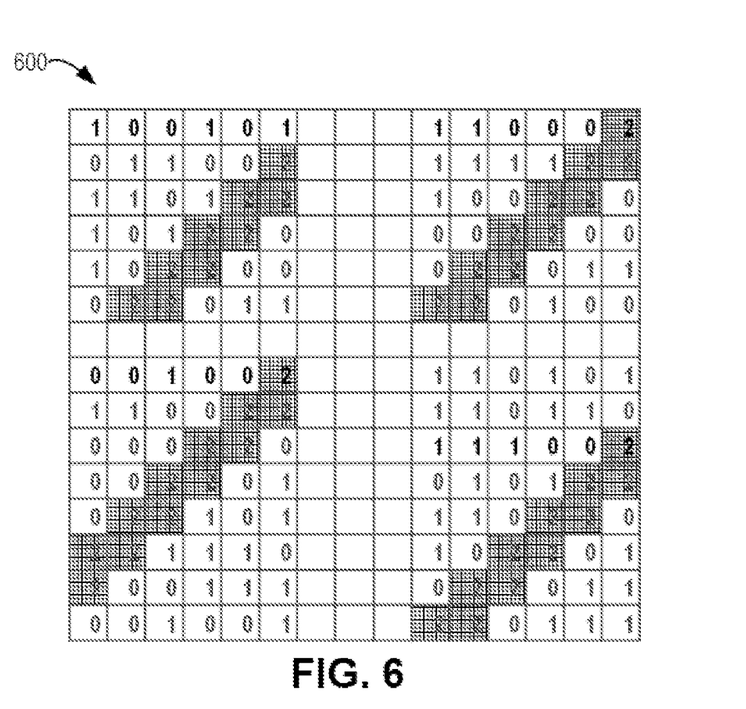
FIG. 6 shows an example of a bitmap for indicating a data type in a storage disk according to some other embodiments of the present disclosure.

FIG. 6 shows example bitmap 600 according to some embodiments of the present disclosure. As shown in FIG. 6, each unit in bitmap 600 corresponds to a storage block in storage disk 122 (indexed from 1 to N) in storage system 120 to indicate the type of data stored in the storage block. In this example, each unit consists of 2 bits of information, and the values of the 2 bits may be 00, 01, 10, and 11 (may be expressed as 0, 1, 2, and 3 in decimal). Each unit indicates whether data corresponding to the storage block in storage disk 120 is a valid data subtype corresponding to a high popularity level, a medium popularity level, or a low popularity level, or a parity data type. For example, the decimal "0" in each unit in bitmap 600 indicates the parity data type, the decimal "1" indicates the valid data subtype with the low popularity level, the decimal "2" indicates the valid data subtype with the medium popularity level, and so on.

It should be understood that the bitmaps shown in FIG. 5 and FIG. 6 are only examples. The corresponding relationship between the arrangement of each bit in these bitmaps and the storage disk of the storage system is not limited, either. In some embodiments, respective bitmaps may be maintained for different storage disks 122. Alternatively, bitmap information corresponding to the storage blocks of different storage disks 122 may be arranged in the same column or the same row of the bitmap.

In the example of FIG. 5, "1" in each bit in bitmap 500 indicates the valid data type, and "0" indicates the parity data type. According to bitmap 500, the "1" marked in each bit may indicate storage block 502 that stores valid data in storage disk 122. The remaining storage blocks may be determined to store parity data.

In some embodiments, indication information for the type of data in one or more storage disks 122 may be determined and stored in advance, for example, bitmap 500 and/or bitmap 600. Such indication information may be stored, for example, as metadata of specific storage disk 122 or storage system 120. When data reconstruction is started, such indication information can be accessed to determine the type of data, and a data reconstruction order for these types of data can be determined accordingly.

In some embodiments, the division of valid data and parity data may be determined when a storage space of storage disk 122 is allocated. For example, in a RAID-based storage technology, the type of data to be stored in each storage block of storage disk 122 can be determined through RAID striping rules, even if the data has not been actually stored in the storage block. In some examples, the storage of valid data and parity data in the storage block may not change, so the bitmap, such as bitmap 500, may not be updated during the actual operation of storage disk 122. In other examples, it may be determined according to the type of data actually stored in the storage block.

In some embodiments, if the valid data is subdivided based on the popularity level, the popularity level of the valid data stored in storage disk 122 may also be detected to update the corresponding bitmap. For example, if the popularity level of data of one or more storage blocks increases so that the data may be divided into another valid data subtype, the bitmap may be updated accordingly to indicate the updated data type. In some embodiments, the detection and update of the popularity level of the data may be performed periodically. The length of the period may be set as needed, and the embodiments of the present disclosure are not limited in this respect.

In some embodiments discussed above, bitmaps are used to indicate different types of data in storage disk 122. In other embodiments, the types of data stored in different storage areas of storage disk 122 may also be determined and identified in other ways. For example, if valid data is stored in a storage area, the mapping between a storage address of the storage area and a valid data type may be determined and stored.

At block 430, storage management system 110 performs the data reconstruction on the plurality of types of data in the determined order. The data reconstruction may be triggered since storage disk 122 in storage system 120 fails or is pulled out.

In some embodiments, storage management system 110 may perform the data reconstruction on data stored in the plurality of storage blocks of the storage disk with reference to the predefined bitmap. As discussed above, each bit in the bitmap may indicate the type of data in each storage block of storage disk 122, and accordingly can also indicate the order of each type of data during the data reconstruction. Therefore, in some embodiments, if storage management system 110 determines to perform data reconstruction for certain storage disk 122, storage management system 110 may obtain a corresponding bitmap, and determine, based on the bitmap, which types of data (more specifically, data stored in which storage blocks) should be reconstructed first, and which types of data (more specifically, data stored in which storage blocks) may be reconstructed later.

In the example of FIG. 5, it is assumed that a storage disk with a disk index of 6 fails, data therein needs to be reconstructed. Storage management system 110 may obtain bitmap 500 and determine that part 510 in bitmap 500 indicates the type of data of each storage block 502 in storage disk 6. For bits marked with "1" in part 510, storage management system 110 may determine that valid data is stored in storage blocks 502 corresponding to these bits, thereby determining to preferentially reconstruct the valid data in the storage blocks corresponding to the bits marked with "1." After the valid data is reconstructed, storage management system 110 determines storage blocks 502 corresponding to bits marked with "0" in part 510, and thereby starts to recover parity data stored in these storage blocks.

Figure 7A:
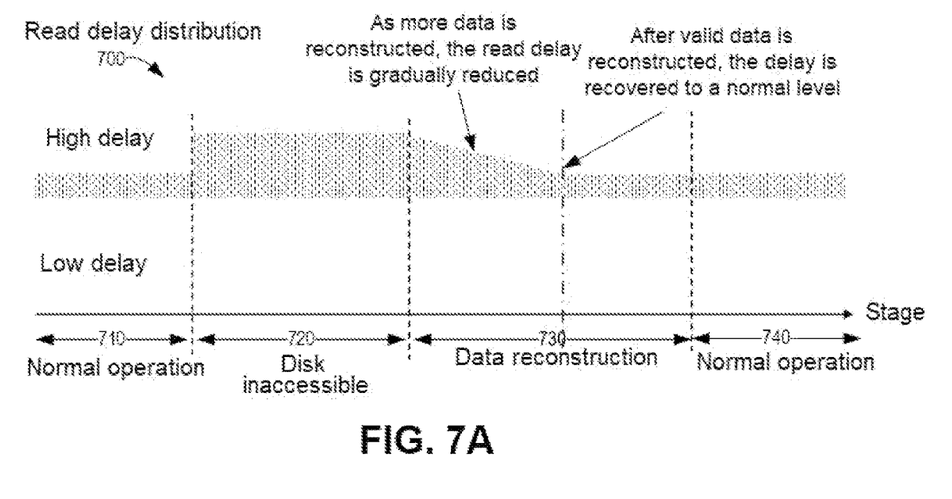
FIG. 7A shows an example of read delay distribution of a storage system at various stages including data reconstruction.

FIG. 7A shows an example of read delay distribution 700 of a storage system at various stages including data reconstruction. In the example of FIG. 7A, it is assumed that data reconstruction is performed respectively according to a valid data type and a parity data type in the data reconstruction stage, and the reconstruction of the valid data is performed preferentially.

As shown in FIG. 7A, if storage disk 122 of storage system 120 is inaccessible due to a failure or the like, the storage system enters disk inaccessible stage 720 from normal operation stage 710. In disk inaccessible stage 710, the system performance is reduced because the inaccessible storage disk cannot provide services. As inaccessible storage disk 122 is replaced with new storage disk 122, data reconstruction stage 730 begins. In data reconstruction stage 730, storage management system 110 determines, based on a bitmap (for example, bitmap 500), to preferentially reconstruct valid data stored in one or more storage blocks of storage disk 122. After the valid data reconstruction is completed, storage management system 110 starts to reconstruct the parity data. After the data reconstruction is completed, the storage system enters normal operation stage 740.

As shown in FIG. 7A, in data reconstruction stage 730, as more valid data is reconstructed, the read delay of storage system 120 will be gradually reduced. After all valid data is reconstructed, the read delay of storage system 120 can be recovered to a normal level, because the reconstructed valid data has been stored in a new storage disk at this moment and the data access to the valid data can be completed according to a normal low delay. Storage management system 110 may continue to perform the reconstruction of the parity data in the data reconstruction stage. Compared with a traditional data reconstruction strategy, according to the example embodiments of the present disclosure, the access delay can be recovered to a normal level more quickly even if the data reconstruction process has not ended.

Figure 7B:
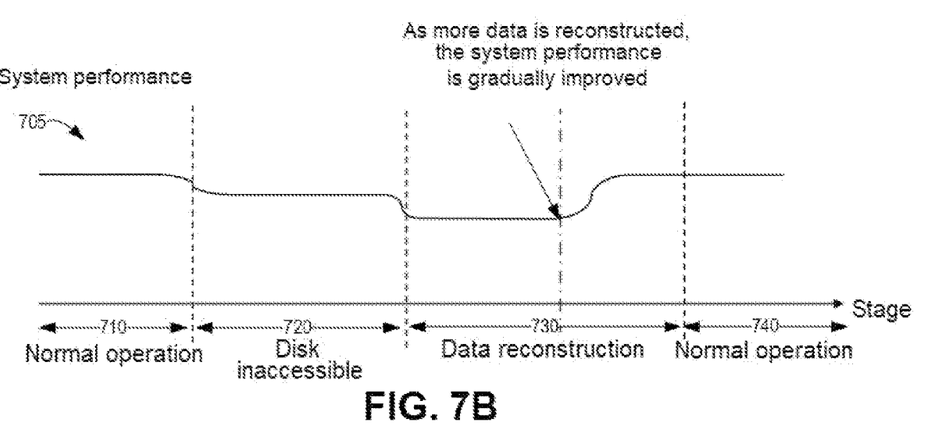
FIG. 7B shows an example of system performance of a storage system at various stages including data reconstruction.

FIG. 7B shows an example of system performance curve 705 of a storage system at various stages including data reconstruction. In the example of FIG. 7B, it is assumed that data reconstruction is performed respectively according to a valid data type and a parity data type in the data reconstruction stage, and the reconstruction of the valid data is performed preferentially. The system performance of the storage system may be measured by the throughput and/or BW of the system. The throughput may be measured, for example, by the number of I/O requests that can be processed by the system per unit time (e.g., IOPS).

As shown in FIG. 7B, storage system 120 enters disk inaccessible stage 720 from normal operation stage 710. In disk inaccessible stage 710, the system performance is degraded because the inaccessible storage disk cannot provide services. As the inaccessible storage disk is replaced with a new storage disk, the process will enter data reconstruction stage 730 to perform data reconstruction on the inaccessible storage disk. In data reconstruction stage 730, if the reconstruction of valid data is completed, the system performance will be gradually improved, because storage system 120 may already provide access to all valid data at this moment. Compared with a traditional data reconstruction strategy, according to the example embodiments of the present disclosure, the system performance can be improved to a normal level more quickly even if the data reconstruction process has not ended.

Figure 8:
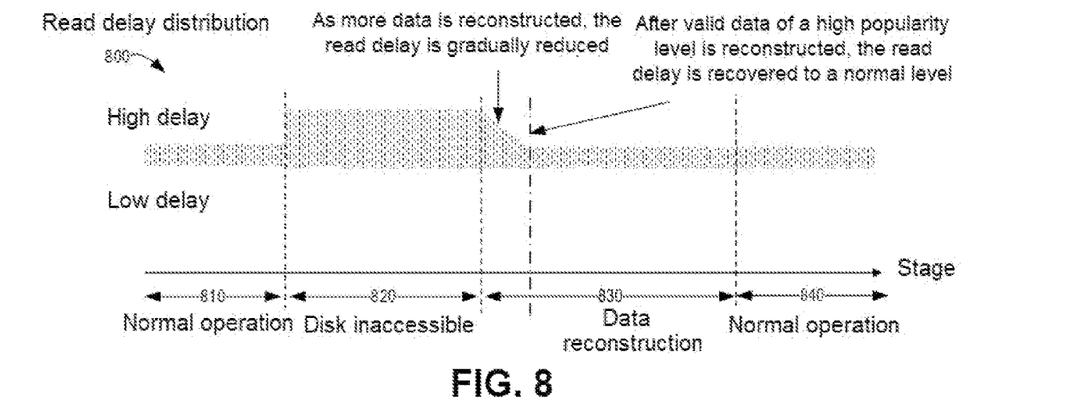
FIG. 8 shows another example of read delay distribution of a storage system at various stages including data reconstruction.

FIG. 8 shows an example of read delay distribution 800 of a storage system at various stages including data reconstruction. In the example of FIG. 8, it is assumed that in the data reconstruction stage, the valid data type is refined according to different popularity levels, and the data reconstruction is performed in an order of valid data subtypes from a high popularity level to a low popularity level, and then to the parity data type.

As shown in FIG. 8, if storage disk 122 of storage system 120 is inaccessible due to a failure or the like, the storage system enters disk inaccessible stage 820 from normal operation stage 810. In disk inaccessible stage 810, the system performance is degraded because the inaccessible storage disk cannot provide services. As inaccessible storage disk 122 is replaced with new storage disk 122, data reconstruction stage 830 begins. In data reconstruction stage 830, storage management system 110 determines, based on a bitmap (for example, bitmap 600), to preferentially reconstruct valid data of a higher popularity level stored in one or more storage blocks of storage disk 122. After all valid data is reconstructed according to the popularity levels, storage management system 110 starts to reconstruct the parity data. After the data reconstruction is completed, the storage system enters normal operation stage 840.

As shown in FIG. 8, in data reconstruction stage 830, as more valid data is reconstructed, the read delay of storage system 120 will be gradually reduced. After the valid data of the high popularity level is reconstructed, the read delay of storage system 120 can be further reduced to recover to a normal level, because all the frequently initiated read access requests require the reading of valid data of high popularity and the valid data has been stored in a new storage disk. Therefore, the data access to the valid data of high popularity may be completed with a normal low delay. Storage management system 110 may continue to perform the reconstruction of the valid data of the low popularity level and the parity data in the data reconstruction stage. By dividing the popularity of the valid data, the access delay of the storage system, especially the read delay, may be further improved, for example, may be recovered to a normal level more quickly. Correspondingly, although not shown, the system performance will also be improved to recover to a normal level more quickly.

Figure 9:
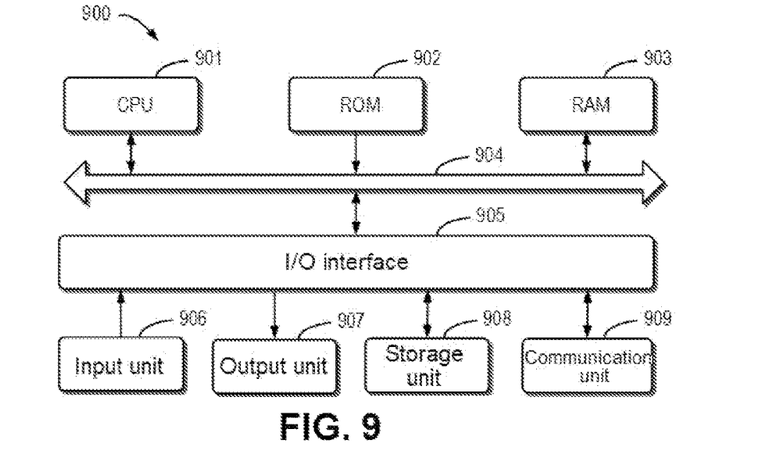
FIG. 9 shows a schematic block diagram of a device that can be used to implement an embodiment of the present disclosure.

FIG. 9 schematically shows a block diagram of device 900 that can be used to implement an embodiment of the present disclosure. Device 900 may be implemented as storage management system 110 or included in storage management system 110.

As shown in FIG. 9, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. Various programs and data required for the operation of device 900 may also be stored in RAM 903. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as process 400, may be executed by processing unit 901. For example, in some embodiments, process 400 may be implemented as a computer software program that is tangibly included in a machine-readable medium, for example, storage unit 908. In some embodiments, part or all of the computer program may be loaded and/or installed onto device 900 via ROM 902 and/or communication unit 909. When the computer program is loaded to RAM 903 and executed by CPU 901, one or more steps of process 400 described above may be performed.

As used herein, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," and the like may refer to different or the same objects. Other explicit and implicit definitions may also be included below.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowcharts can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope disclosed herein.

The invention claimed is:

1. A method for data reconstruction, comprising:
   determining a plurality of types of data stored in a storage disk;
   determining an order in which data reconstruction is to be performed on the plurality of types of data based on corresponding likelihoods that the plurality of types of data are expected to be accessed; and
   performing the data reconstruction on the plurality of types of data in the determined order;
   wherein determining the order in which data reconstruction is to be performed includes:
   generating a ranking of the plurality of types of data based on expected read access rates of the plurality of types of data, the ranking indicating that a particular valid data type is expected to be read more often than a particular parity data type.

2. The method according to claim 1, wherein determining the order comprises:
   if it is determined that a first likelihood that a first type of data in the plurality of types of data is expected to be accessed is higher than a second likelihood that a second type of data in the plurality of types of data is expected to be accessed, prioritizing the first type of data over the second type of data.

3. The method according to claim 1, wherein determining the plurality of types of the data comprises:
   classifying the data into a valid data type and a parity data type.

4. The method according to claim 3, wherein a likelihood that data of the valid data type is expected to be accessed is higher than a likelihood that data of the parity data type is expected to be accessed.

5. The method according to claim 3, wherein determining the plurality of types of the data comprises:
   classifying data of the valid data type into a plurality of valid data subtypes based on a plurality of popularity levels of the data of the valid data type among the data.

6. The method according to claim 3, wherein a first popularity level of a first valid data subtype among a plurality of valid data subtypes is higher than a second popularity level of a second valid data subtype among the plurality of valid data subtypes, and a first likelihood that the first valid data subtype is expected to be accessed is higher than a second likelihood that the second valid data subtype is expected to be accessed; and
    wherein a likelihood that the plurality of valid data subtypes are expected to be accessed is higher than a likelihood that the parity data type is expected to be accessed.

7. The method according to claim 1, wherein determining a plurality of types of data stored in the storage disk comprises:
    obtaining a bitmap corresponding to the storage disk, one bit in the bitmap indicating a type of data stored in one of a plurality of storage blocks of the storage disk; and
    determining a plurality of types of data stored in the plurality of storage blocks based on the bitmap.

8. The method according to claim 7, wherein at least one bit in the bitmap indicates that a type of valid data stored in at least one of the storage blocks is based on a popularity of the valid data, and
    the method further comprises: detecting the popularity of the valid data stored in the at least one storage block, and updating the at least one bit of the bitmap based on a detected popularity.

9. The method according to claim 7, wherein performing the data reconstruction comprises:
    performing data reconstruction on data stored in the plurality of storage blocks of the storage disk with reference to the bitmap.

10. The method according to claim 1,
    wherein performing the data reconstruction includes:
        rebuilding, based on the ranking, data of degraded storage positions of the storage disk, data of a particular degraded storage position being a first type of data and rebuilt using a second type of data.

11. An electronic device, comprising:
    at least one processor; and
    at least one memory storing computer program instructions, wherein the at least one memory and the computer program instructions are configured to cause, together with the at least one processor, the electronic device to perform actions comprising:
        determining a plurality of types of data stored in a storage disk;
        determining an order in which data reconstruction is to be performed on the plurality of types of data based on corresponding likelihoods that the plurality of types of data are expected to be accessed; and
        performing the data reconstruction on the plurality of types of data in the determined order;
    wherein determining the order in which data reconstruction is to be performed includes:
        generating a ranking of the plurality of types of data based on expected read access rates of the plurality of types of data, the ranking indicating that a particular valid data type is expected to be read more often than a particular parity data type.

12. The electronic device according to claim 11, wherein determining the order comprises:
    if it is determined that a first likelihood that a first type of data in the plurality of types of data is expected to be accessed is higher than a second likelihood that a second type of data in the plurality of types of data is expected to be accessed, prioritizing the first type of data over the second type of data.

13. The electronic device according to claim 11, wherein determining the plurality of types of the data comprises:
    classifying the data into a valid data type and a parity data type.

14. The electronic device according to claim 13, wherein a likelihood that data of the valid data type is expected to be accessed is higher than a likelihood that data of the parity data type is expected to be accessed.

15. The electronic device according to claim 13, wherein determining the plurality of types of the data comprises:
    classifying data of the valid data type into a plurality of valid data subtypes based on a plurality of popularity levels of the data of the valid data type among the data.

16. The electronic device according to claim 13, wherein a first popularity level of a first valid data subtype among a plurality of valid data subtypes is higher than a second popularity level of a second valid data subtype among the plurality of valid data subtypes, and a first likelihood that the first valid data subtype is expected to be accessed is higher than a second likelihood that the second valid data subtype is expected to be accessed; and
    wherein a likelihood that the plurality of valid data subtypes are expected to be accessed is higher than a likelihood that the parity data type is expected to be accessed.

17. The electronic device according to claim 11, wherein determining a plurality of types of data stored in the storage disk comprises:
    obtaining a bitmap corresponding to the storage disk, one bit in the bitmap indicating a type of data stored in one of a plurality of storage blocks of the storage disk; and
    determining a plurality of types of data stored in the plurality of storage blocks based on the bitmap.

18. The electronic device according to claim 17, wherein at least one bit in the bitmap indicates that a type of valid data stored in at least one of the storage blocks is based on a popularity of the valid data, and
    the actions further comprising: detecting the popularity of the valid data stored in the at least one storage block, and updating the at least one bit of the bitmap based on a detected popularity.

19. The electronic device according to claim 17, wherein performing the data reconstruction comprises:
    performing data reconstruction on data stored in the plurality of storage blocks of the storage disk with reference to the bitmap.

20. A computer program product having a non-transitory computer readable medium which stores a set of instructions to perform data reconstruction; the set of instructions, when carried out by computerized circuitry, causing the computerized circuitry to perform a method of:
    determining a plurality of types of data stored in a storage disk;
    determining an order in which data reconstruction is to be performed on the plurality of types of data based on corresponding likelihoods that the plurality of types of data are expected to be accessed; and
    performing the data reconstruction on the plurality of types of data in the determined order;
    wherein determining the order in which data reconstruction is to be performed includes:
        generating a ranking of the plurality of types of data based on expected read access rates of the plurality of types of data, the ranking indicating that a particular valid data type is expected to be read more often than a particular parity data type.

21. The computer program product according to claim 20, wherein determining the order comprises:
if it is determined that a first likelihood that a first type of data in the plurality of types of data is expected to be accessed is higher than a second likelihood that a second type of data in the plurality of types of data is expected to be accessed, prioritizing the first type of data over the second type of data.

22. The computer program product according to claim 20, wherein determining the plurality of types of the data comprises:
classifying the data into a valid data type and a parity data type.

23. The computer program product according to claim 22, wherein a likelihood that data of the valid data type is expected to be accessed is higher than a likelihood that data of the parity data type is expected to be accessed.

24. The computer program product according to claim 22, wherein determining the plurality of types of the data comprises:
classifying data of the valid data type into a plurality of valid data subtypes based on a plurality of popularity levels of the data of the valid data type among the data.

25. The computer program product according to claim 21, wherein a first popularity level of a first valid data subtype among a plurality of valid data subtypes is higher than a second popularity level of a second valid data subtype among the plurality of valid data subtypes, and a first likelihood that the first valid data subtype is expected to be accessed is higher than a second likelihood that the second valid data subtype is expected to be accessed; and
wherein a likelihood that the plurality of valid data subtypes are expected to be accessed is higher than a likelihood that the parity data type is expected to be accessed.

26. The computer program product according to claim 19, wherein determining a plurality of types of data stored in the storage disk comprises:
obtaining a bitmap corresponding to the storage disk, one bit in the bitmap indicating a type of data stored in one of a plurality of storage blocks of the storage disk; and
determining a plurality of types of data stored in the plurality of storage blocks based on the bitmap.

27. The computer program product according to claim 26, wherein at least one bit in the bitmap indicates that a type of valid data stored in at least one of the storage blocks is based on a popularity of the valid data, and
the method further comprises: detecting the popularity of the valid data stored in the at least one storage block, and updating the at least one bit of the bitmap based on a detected popularity.

28. The computer program product according to claim 26, wherein performing the data reconstruction comprises:
performing data reconstruction on data stored in the plurality of storage blocks of the storage disk with reference to the bitmap.

\* \* \* \* \*